United States Patent
Matthe et al.

(10) Patent No.: US 9,853,330 B2
(45) Date of Patent: Dec. 26, 2017

(54) ENHANCED CONDUCTIVE FLUID SENSOR FOR HV LIQUID COOLED BATTERY PACKS

(75) Inventors: Roland Matthe, Bischofsheim (DE); Andrew J. Namou, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 363 days.

(21) Appl. No.: 13/545,800

(22) Filed: Jul. 10, 2012

(65) Prior Publication Data

US 2014/0015511 A1   Jan. 16, 2014

(51) Int. Cl.
| | |
|---|---|
| G01N 27/00 | (2006.01) |
| H01M 10/42 | (2006.01) |
| G01M 3/16 | (2006.01) |
| H01M 10/625 | (2014.01) |
| H01M 10/633 | (2014.01) |
| H01M 10/613 | (2014.01) |

(52) U.S. Cl.
CPC ......... *H01M 10/425* (2013.01); *G01M 3/165* (2013.01); *H01M 10/613* (2015.04); *H01M 10/625* (2015.04); *H01M 10/633* (2015.04)

(58) Field of Classification Search
CPC ............ G01M 3/02; G01M 3/40; G01M 3/16; G01M 17/007; G01M 10/48; G01M 3/04; G01M 3/045; G01M 3/165; G01M 3/186; H01M 10/4228; H01M 10/48
USPC .......... 324/71.1, 750.08, 426; 340/438, 455; 73/40
See application file for complete search history.

(56) References Cited

U.S. PATENT DOCUMENTS

| | | | | | |
|---|---|---|---|---|---|
| 4,319,232 | A | * | 3/1982 | Westphal et al. ............. | 340/604 |
| 4,552,823 | A | * | 11/1985 | Wozniak ................. | H01M 2/18 |
| | | | | | 429/139 |
| 5,158,201 | A | * | 10/1992 | Bartlow ............... | B65D 90/022 |
| | | | | | 220/560.01 |
| 5,551,287 | A | * | 9/1996 | Maute ..................... | E21B 47/01 |
| | | | | | 166/250.01 |
| 5,963,019 | A | * | 10/1999 | Cheon ...................... | H02H 7/18 |
| | | | | | 320/134 |
| 6,175,310 | B1 | * | 1/2001 | Gott .............................. | 340/605 |
| 6,308,728 | B1 | * | 10/2001 | Frazier .................... | G01M 3/04 |
| | | | | | 137/15.11 |
| 6,337,559 | B1 | * | 1/2002 | Sato ............................. | 320/134 |
| 6,877,359 | B2 | * | 4/2005 | Huang et al. ..................... | 73/40 |
| 8,281,645 | B2 | * | 10/2012 | Dryden ............................ | 73/40 |

(Continued)

FOREIGN PATENT DOCUMENTS

JP        2007273353 A   * 10/2007

*Primary Examiner* — Huy Q Phan
*Assistant Examiner* — David Frederiksen
(74) *Attorney, Agent, or Firm* — John A. Miller; Miller IP Group, PLC

(57) ABSTRACT

A sensor for detecting leaked cooling fluid in a battery pack or container. The sensor is part of a sensor wire, where one end of the wire is electrically coupled to the positive terminal or the negative terminal of the battery pack and the other end of the wire is positioned at a location where the leaked cooling fluid may accumulate. A fault isolation detection circuit monitors a voltage output from the sensor and determines that there is a cooling fluid leak if the measured voltage potential is greater than a predetermined voltage threshold.

17 Claims, 3 Drawing Sheets

(56) References Cited

U.S. PATENT DOCUMENTS

| | | | |
|---|---|---|---|
| 2003/0004546 A1* | 1/2003 | Casey | A61N 1/3787 607/1 |
| 2003/0110834 A1* | 6/2003 | Weber | G01M 3/28 73/40 |
| 2004/0050420 A1* | 3/2004 | Huang | G01M 3/16 137/312 |
| 2004/0105758 A1* | 6/2004 | Ross | 417/44.1 |
| 2004/0208780 A1* | 10/2004 | Faries, Jr. | A61B 46/10 422/3 |
| 2005/0036290 A1* | 2/2005 | Yang | G06F 1/1613 361/704 |
| 2007/0006638 A1* | 1/2007 | Lim et al. | 73/40 |
| 2007/0275296 A1* | 11/2007 | Ueda et al. | 429/61 |
| 2009/0120166 A1* | 5/2009 | Weitz | G01M 3/16 73/46 |
| 2009/0263705 A1* | 10/2009 | Anantharaman | 429/61 |
| 2010/0141209 A1* | 6/2010 | Shiu | H02J 7/0016 320/120 |
| 2010/0294721 A1* | 11/2010 | Frazier | G01M 3/04 210/660 |
| 2011/0053283 A1* | 3/2011 | Hood | G01N 33/14 436/104 |
| 2011/0250477 A1* | 10/2011 | Yoshida et al. | 429/61 |
| 2012/0105220 A1* | 5/2012 | Wang | 340/438 |
| 2012/0148890 A1* | 6/2012 | Goto | H01M 2/1077 429/90 |
| 2012/0251859 A1* | 10/2012 | Payne et al. | 429/90 |

* cited by examiner

ENHANCED CONDUCTIVE FLUID SENSOR FOR HV LIQUID COOLED BATTERY PACKS

BACKGROUND OF THE INVENTION

Field of the Invention

This invention relates generally to a sensor for detecting cooling fluid that has leaked from a liquid cooled battery pack and, more particularly, to a sensor for detecting cooling fluid that has leaked from a liquid cooled battery pack on an electric vehicle, where the sensor includes a wire electrically coupled to a terminal of the battery pack that extends into an area where the leaked fluid may accumulate.

Discussion of the Related Art

Electric vehicles are rapidly gaining popularity in today's automotive marketplace. These vehicles include hybrid vehicles, such as the extended range electric vehicles (EREV) that combine a battery and a main power source, such as an internal combustion engine, fuel cell systems, etc., and electric only vehicles, such as the battery electric vehicles (BEV). Electric vehicles offer several desirable features, such as eliminating local emissions and usage of petroleum-based fuels at the consumer level, and potentially lower operating costs. Electric vehicle batteries can be of different battery types, such as lithium-ion, nickel-metal hydride, lead-acid, etc. A typical high voltage battery system for an electric vehicle may include a large number of battery cells or modules including several battery cells to meet the vehicle power and energy requirements. Maximizing battery pack performance and life are key considerations in the design and operation of electric vehicles.

In order to help maximize battery pack performance and durability, the temperature of the battery pack can be controlled. For certain types of battery packs, such as lithium-ion, it is known in the art to provide a thermal management system that flows a cooling fluid around the various battery cells in the battery pack to remove heat therefrom. Additionally, this thermal management system can include heaters to heat the cooling fluid, which in turn heats the battery to a desirable operating temperature during, for example, cold vehicle starts. The various flow channels and flow paths within the battery pack and battery enclosure are sealed so that the cooling fluid is contained in the proper area. However, as a result of many conditions, such as age, wear, temperature changes, etc., these flow channels may incur leaks, which causes the cooling fluid to flow out of the flow channels.

Fault isolation detection systems are sometimes employed in electrical circuits to provide electrical fault detection. Electric vehicles and electric hybrid vehicles include fault isolation circuits that isolate the high voltage of the battery from the remaining electrical components on the vehicle. Circuits are provided to monitor that isolation and if there is a breech in the isolation, warning signals can be provided to indicate the loss of isolation, including automatically shutting down the vehicle battery.

Many different types of fault isolation circuits exist in the art including both active isolation circuits and passive isolation circuits, where the isolation circuits may be internal to the battery circuit or external to the battery circuit. In order to provide electrical fault isolation, some vehicles are equipped with a battery disconnect unit (BDU) that automatically disconnects or removes battery power from the vehicle after a crash event by opening battery contactors. Also, it is known in the art to employ a manual service disconnect (MSD), which is a device that separates a battery into two parts, where a trained responder responding to a vehicle crash could remove the MSD to isolate the battery.

Because the cooling fluid that cools the battery pack may be conductive, loss of that cooling fluid may create conductive paths where loss of isolation may occur. Often, the electrical isolation circuitry in a vehicle is provided at an upper location in the battery enclosure and fluid that may have leaked from the thermal management system tends to collect in a lower area of the battery pack housing or container. Thus, that isolation circuitry may not detect a leak until the fluid level has reached a significantly high level, which is typically not desirable.

SUMMARY OF THE INVENTION

In accordance with the teachings of the present invention, a sensor for detecting leaked cooling fluid in a battery pack or container is disclosed. The sensor is part of a sensor wire, where one end of the wire is electrically coupled to the positive terminal or the negative terminal of the battery pack and the other end of the wire is positioned at a location where the leaked cooling fluid may accumulate. A fault isolation detection circuit monitors a voltage output from the sensor and determines that there is a cooling fluid leak if the measured voltage potential is greater than a predetermined voltage threshold.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a sensor for detecting leaked cooling fluid in a battery pack on a vehicle is merely exemplary in nature, and is in no way intended to limit the invention or its applications or uses. For example, the present invention has application for detecting fluid that has leaked from a cooling system in a vehicle battery. However, as will be appreciated by those skilled in the art, the liquid sensor of the invention may have other applications.

As will be discussed in detail below, the present invention proposes a sensor electrically coupled to a battery in a vehicle that detects cooling fluid that has leaked from a thermal management system, and which causes a fault isolation circuit to indicate loss of isolation to detect the leak.

Figure 1:
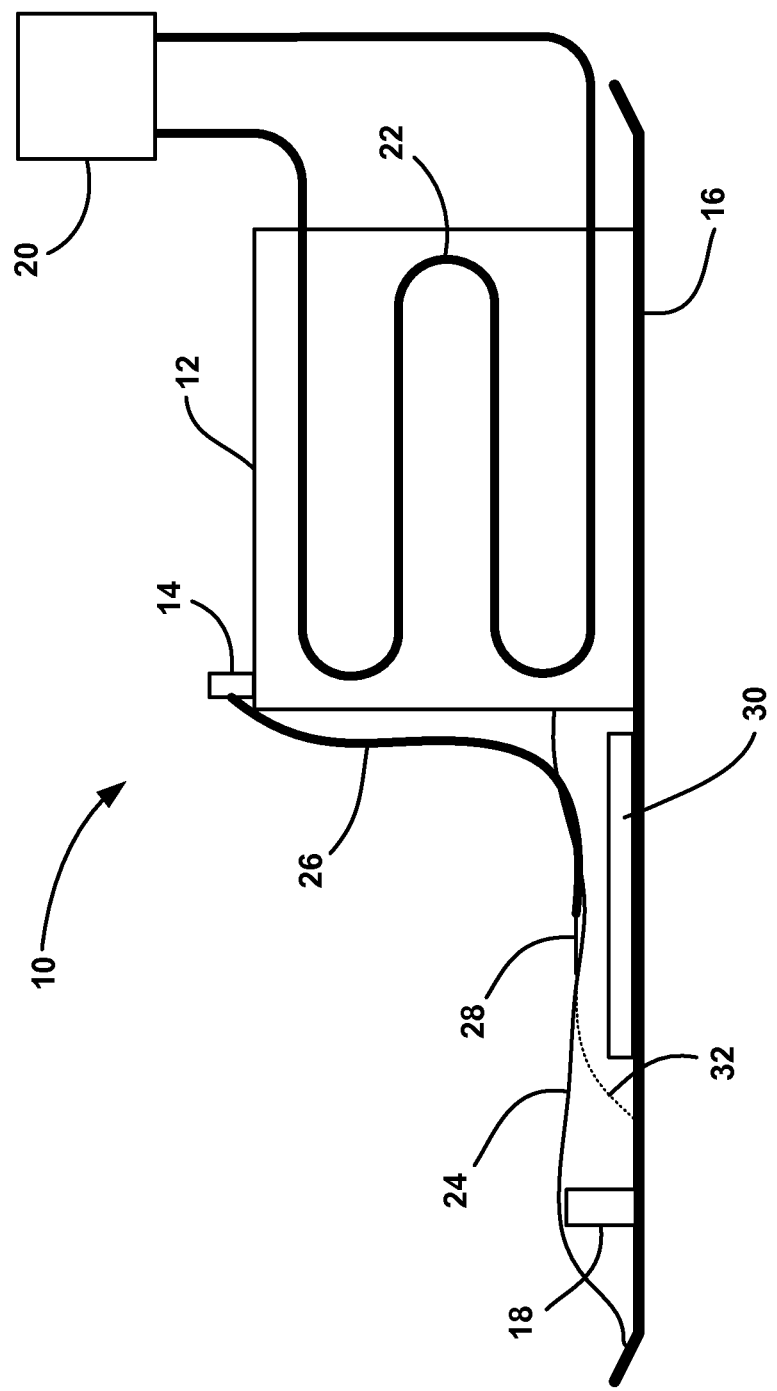
FIG. 1 is an illustration of a battery system including a sensor for detecting leaked cooling fluid.

FIG. 1 is an illustration of a battery system 10 including a battery pack 12. The battery pack 12 is intended to represent any suitable liquid cooled battery pack including any number of battery cells, any suitable electrical configuration of battery cells, any suitable electrical configuration of battery modules, any suitable battery chemistry, such as lithium-ion, metal hydride and lead-acid, etc. The battery pack 12 includes a battery terminal 14 that is intended to represent either the positive terminal or the negative terminal of the battery pack 12 and can be at any suitable location in the battery pack 12 where battery voltage can be obtained. The battery pack 12 is shown mounted on a support tray 16 which is intended to represent any suitable mounting structure or enclosure for the battery pack 12. Mounting bolts 18 or other suitable mounting structures may secure the support tray 16 to a vehicle structure (not shown). The support tray 16 is typically a metal, which may be conductive, but can also be other non-conductive materials, such as a hardened plastic. The support tray 16 and/or the bolt 18 may be electrically coupled to vehicle chassis ground and as such are at a reference voltage potential.

The battery system 10 also includes a thermal management system 20 that directs a suitable cooling fluid, such as DexCool, Glysantin, etc., through flow channels 22 that are provided within the battery pack 12. The flow channels 22 can be provided in any suitable configuration within the battery pack 12 and have any suitable diameter. Although not specifically disclosed, the thermal management system 20 will include appropriate pumps, cooling devices, heaters, temperature sensors, etc. to provide the battery cooling and control for the purposes described herein. As discussed above, various conditions may occur where some of the cooling fluid flowing through the flow channels 22 leaks therefrom and out of the battery pack 12. This is represented by leaked cooling fluid 24 that collects within and at the bottom of the support tray 16.

According to the invention, the battery system 10 includes a sensor wire 26 having a sensor 28 extending from an end of the sensor wire 26. The sensor wire 26 is electrically coupled to the terminal 14, which as mentioned can be either the positive or negative terminal of the battery pack 12. The sensor wire 26 can be electrically coupled to either of the positive or negative terminals of the battery pack 12 because neither is at chassis ground and there would be a difference in potential between either of the terminals and ground. The sensor 28 is positioned relative to the support tray 16 at some adjustable and known distance therefrom to detect the accumulation of the fluid 24 that may have leaked from the flow lines 22 and collected within the support tray 16. As will be discussed in detail below, the level of the leaked cooling fluid 24 may eventually reach the sensor 28 which will provide a signal to a high voltage isolation circuit indicating that there is a cooling fluid leak.

As discussed above, some of the various components within the battery system 10 may be conductive or at least partially conductive. Therefore, it is necessary that the position of the sensor 28 be far enough away from those conductive components, known as the "creep distance," so that the voltage potential provided by the battery pack 12 will not cause arcing between the sensor 28 and those electrical components. For example, the end of the sensor 28 needs to be far enough away from the mounting bolt 18 so that the voltage potential therebetween does not create arcing. Further, because it may be desirable to position the sensor 28 quite close to the support tray 16 to detect small amounts of the leaked fluid 24, the battery system 10 includes a non-conductive isolation patch 30 provided on the tray 16 between the sensor 28 and the tray 16. The patch 30 prevents electrical arcing between the sensor 28 and the tray 16 and is of a suitable area and thickness to perform this function. The patch 30 can be made of any suitable material, such as mylar or kapton.

When the level of the leaked fluid 24 reaches the sensor 28, a conductive path 32 is created between the sensor 28 and the tray 16, which is at chassis ground or a reference potential, that causes the isolation detection circuit to detect an electrical imbalance or loss of isolation. In other words, when the conductive path 32 is created as the level of the leaked cooling fluid rises by the sensor 28 being within the fluid 24, the electrical properties of the isolation circuit change because of the current flow from the terminal 14 to ground through the wire 28. For example, providing a know resistance within the wire 26 can create a voltage divider network with other resistances in the battery circuit that can be measured by the isolation circuit. A diode can be provided within the sensor wire 26 in series with the resistor to prevent current flow into the battery pack 12 and provide a reference voltage. The isolation detection circuit is designed so that all of the conductive properties of the fluid 24, the tray 16 and the distance of the conductive path 32 provide an electrical response that can be measured and be used to set a leakage diagnostic signal.

Many different electrical configurations for battery circuits and fault isolation circuits are known in the art, and the inclusion of the sensor wire 26 into those circuits in the proper electrical configuration as discussed herein would be well understood by those skilled in the art to detect a fault isolation indicating a fluid leakage.

Figure 2:
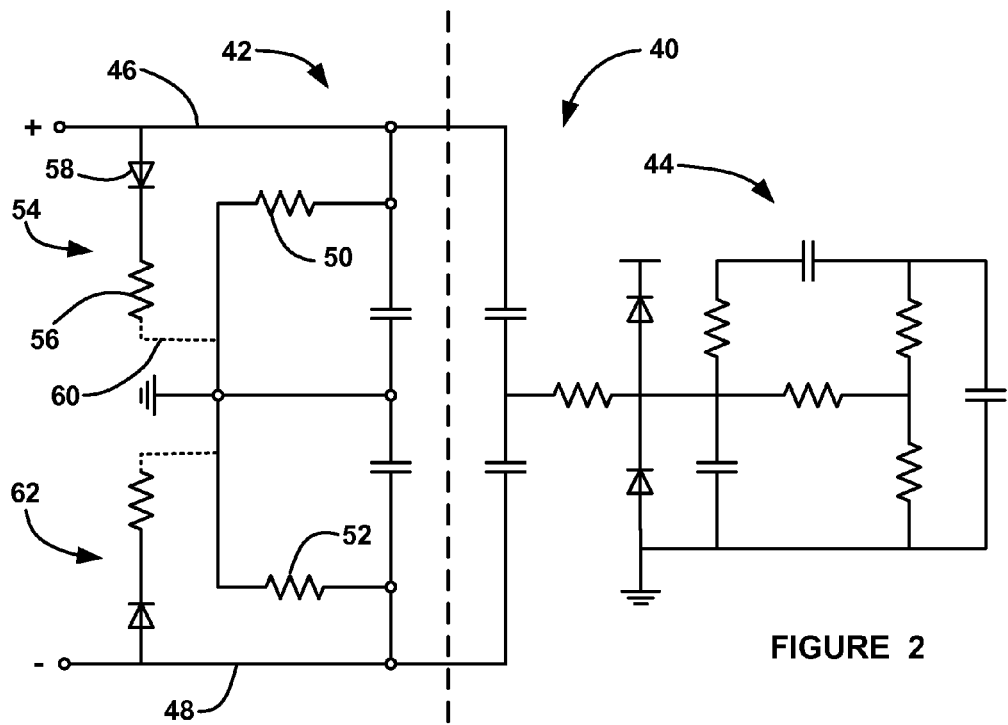
FIG. 2 is a schematic diagram of a battery circuit including a fault isolation circuit and a fluid level sensor.

FIG. 2 is a schematic diagram of a representative example of an electrical circuit 40 including a battery circuit 42 and an isolation circuit 44. The circuit 40 is one general representation of such a circuit, and is not intended to be specific to any one circuit or be limiting to the invention as discussed herein. As mentioned above, known isolation circuits can be passive or active and can be internal or external to the battery enclosure. The dotted line in the circuit 40 shows the separation between the battery circuit 42 and the isolation circuit 44. Thus, for those designs where the isolation circuit 44 is internal to the battery enclosure, the entire circuit 40 would be in the battery enclosure and for those designs where the isolation circuit 44 is external to the battery enclosure, the dotted line separates what portion of the circuit 40 is within the enclosure and what portion of the circuit 40 is outside of the enclosure.

The battery circuit 42 includes a positive battery terminal line 46 and a negative battery terminal line 48. A resistor 50 is provided between the positive battery line 46 and the ground potential and a resistor 52 is provided between the negative battery line 48 and the ground potential. The resistors 50 and 52 are balancing resistors that provide an electrical balance between the positive leg of the circuit 40 and the negative leg of the circuit 40.

According to the invention, a sensor circuit 54 is provided in the battery circuit 42 to detect fluid that has leaked from the flow channels 22, as discussed above. Particularly, the sensor circuit 54 represents the sensing wire 26, where it is shown in its electrical configuration in the circuit 40. The sensor circuit 54 includes a resistor 56 that provides the resistance value that is detected by the isolation circuit 44 if the conductive path 32 is generated because of the level of the fluid 24. Dotted line 64 represents the conductive path 32 that may or may not be present depending on whether the fluid 24 is present. When the fluid 24 is present and the conductive path defined by the line 64 is established, then there is an electrical connection between the line 46 and ground through the resistor 56 in addition to the electrical connection between the line 46 and ground through the balancing resistor 50. When the resistance of the resistor 56 is added to the circuit 40, the resistive balance changes, where the isolation circuit 44 detects that imbalance and provides a fault signal. In other words, the combination of the resistors 50 and 56 in parallel between the terminal line 46 and ground unbalances the circuit 44 by a voltage potential that can be measured.

It may be desirable, but not necessary, to provide a diode 58 in electrical series with the resistor 56 to prevent current flow into the positive or negative lines 46 and 48 and to provide a reference voltage potential. The diode 58 may provide a number of advantages including a diagnostic capability for open or short circuits, a fixed output voltage measurement, such as 0.7v, reverse polarity protection, and rationalization between functional/failed sensors and the isolation detection circuit.

A sensor circuit 60 is shown electrically connected to the negative battery line 48 and ground and is merely representative that the sensor can be provided for either of the positive side or the negative side of the circuit 42. Although it is possible to provide two fluid level sensors connected independently to the positive and negative side of the battery circuit 42, it is only necessary to include one of the sensors for the purposes described herein.

Figure 3:
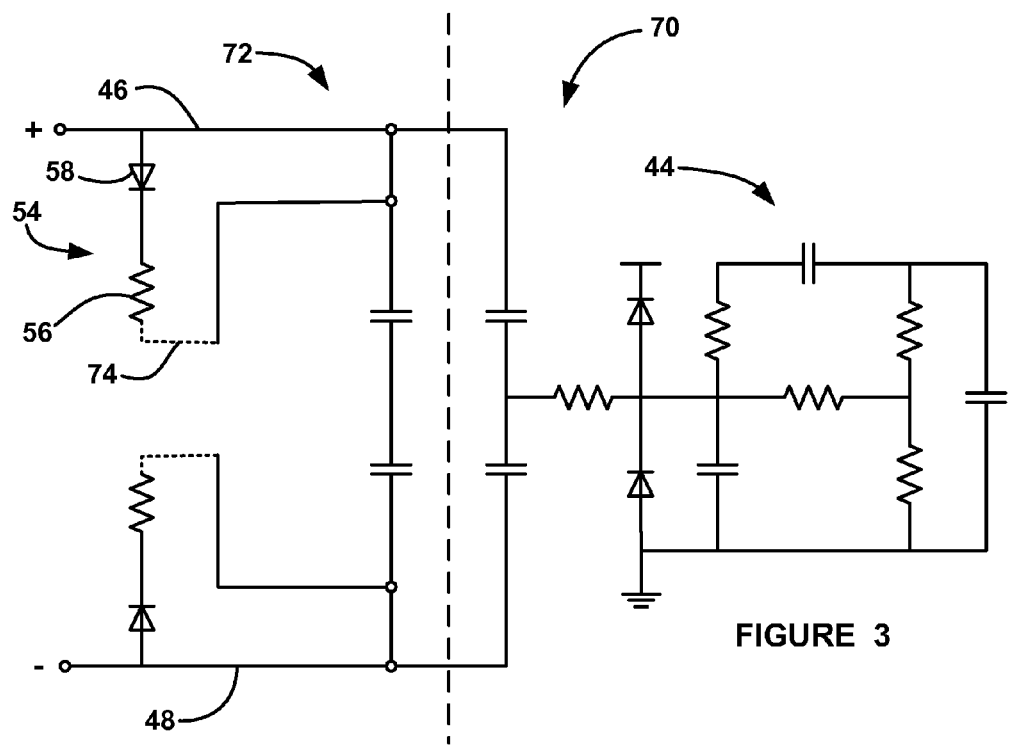
FIG. 3 is a schematic diagram of a battery circuit including a fault isolation circuit and a fluid level sensor.

FIG. 3 is a schematic diagram of a circuit 70 also including a battery circuit 72 and the isolation circuit 44 discussed above. In this embodiment, the battery circuit 72 does not include the balance resistors 50 and 52, where the sensor circuits 54 and 60 are electrically coupled directly to the terminals 46 and 48. In this design, generation of the conductive path represented by dotted line 74 creates a conductive path in addition to the lines 46 or 48 where the resistance can be measured to detect the leak.

Figure 4:
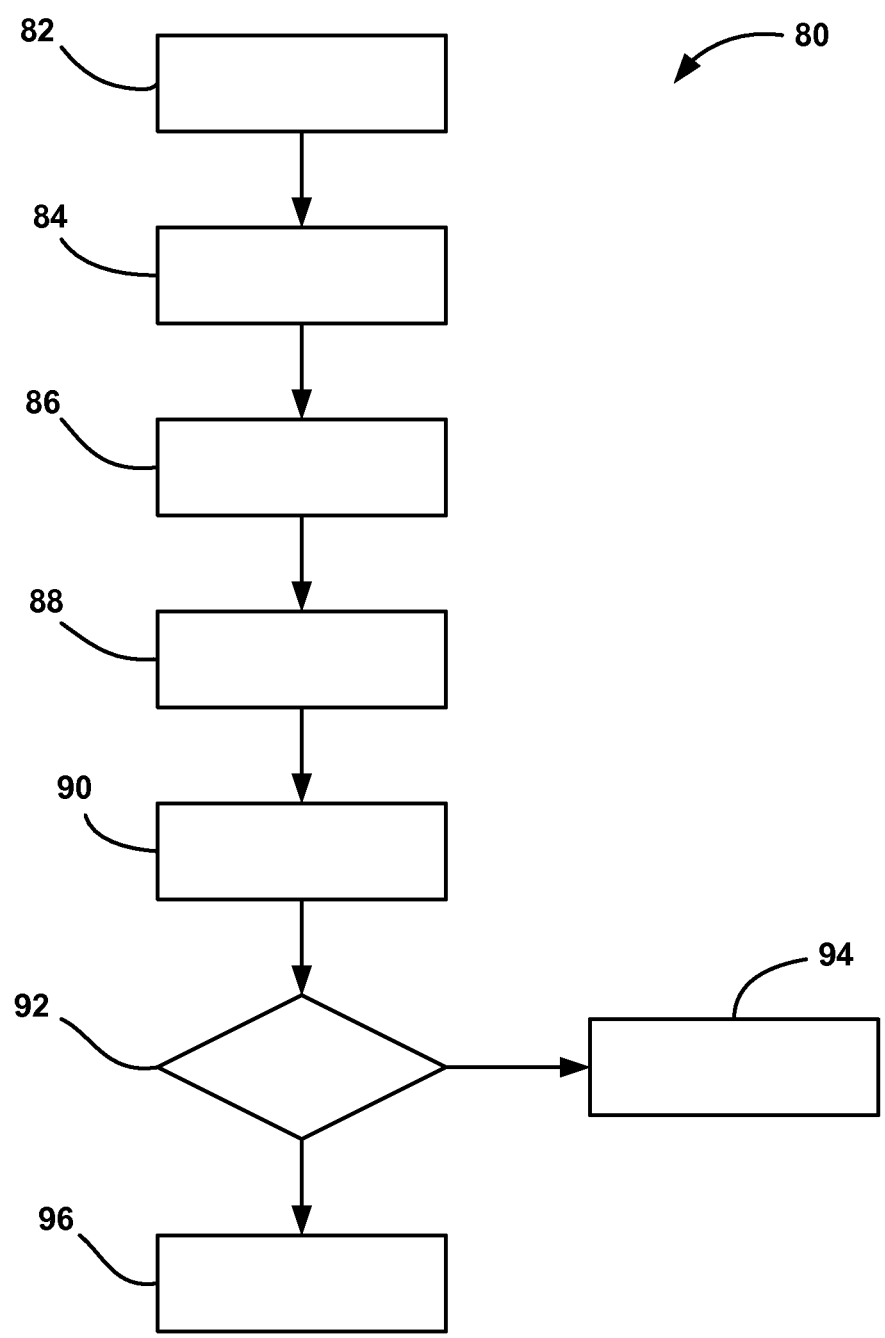
FIG. 4 is a flow chart diagram showing a process for detecting fluid accumulation in a battery pack or container using the sensor.

FIG. 4 is a flow chart diagram 80 showing a process for determining whether a fluid leak is present, as discussed above. The vehicle or battery pack is turned on at box 82 and the isolation circuit 44 is enabled at box 84. The algorithm then runs an isolation detection diagnostic at box 86 and a fluid leakage diagnostic at box 88. The algorithm then reads the output voltage from the leak detection sensor at box 90, and determines whether there is a fluid leak at decision diamond 92. To do this, the algorithm determines whether the measured voltage output across the sensor resistor 56 is greater than a leak voltage threshold. The algorithm also determines, in one non-limiting embodiment, whether the voltage across the resistor 50 is greater than or less than a first voltage balance threshold and whether the voltage across the resistor 52 is greater than or less than a second voltage balance threshold. Thus, in this embodiment, the algorithm determines that a leak may exist by determining that the voltage across the sensor resistor 56 is greater than the leak voltage threshold, and then verifies that the sensor measurement is valid and has not failed by also determining that the voltages across the resistors 50 and 52 are greater than the first and second balance thresholds, respectively. If all three of these conditions are met, the algorithm determines that a leak is occurring and sets the appropriate diagnostic at box 94. If the measured sensor voltage is greater than the leak threshold, but the voltage across the balance resistor 50 and the voltage across the balance resistor 52 are less than the first and second balance thresholds, respectively, then a failed leak detection sensor diagnostic can also be set at the box 94. Otherwise, if none of these conditions are met, the algorithm determines that the fluid is not present, and thus, no leak.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for detecting a cooling fluid leak from a liquid cooled battery pack, said battery pack including a positive terminal and a negative terminal, said method comprising:

electrically coupling a first end of a sensor wire to one of the positive terminal or the negative terminal of the battery pack from which the cooling fluid leak is to be detected;

positioning a second end of the sensor wire at a location where leaked cooling fluid may accumulate;

providing a non-conductive isolation patch between the second end of the sensor wire and a support tray on which the battery pack is mounted, where the isolation patch allows the second end of the sensor wire to be positioned relatively close to the support tray in order to detect a shallow accumulation of the leaked cooling fluid by a presence of a conductive path from the second end of the sensor wire around a peripheral edge of the isolation patch to the support tray, while preventing electrical arcing between the sensor wire and the support tray;

measuring a voltage output from the sensor wire; and determining that the cooling fluid leak has occurred if the measured voltage output is greater than a predetermined voltage threshold.

2. The method according to claim 1 wherein the sensor wire includes a resistor and wherein measuring the voltage output includes measuring the voltage output across the resistor.

3. The method according to claim 2 wherein the sensor wire includes a diode electrically coupled in series with the resistor for preventing electrical current from traveling into the battery pack terminal.

4. The method according to claim 1 wherein a distance between the second end of the sensor wire and the support tray is adjustable.

5. The method according to claim 1 wherein measuring the voltage output includes measuring the voltage output using a voltage isolation circuit.

6. The method according to claim 5 wherein the voltage isolation circuit monitors a voltage balance between the positive terminal and the negative terminal of the battery pack.

7. The method according to claim 1 wherein measuring the voltage output of the sensor wire includes providing an electrical connection between the battery pack terminal and a ground potential by a conductive path from the first end of the sensor wire through the leaked cooling fluid.

8. The method according to claim 1 wherein the battery pack is a high voltage battery pack on an electric vehicle.

9. A method for detecting a cooling fluid leak from a liquid cooled battery pack on an electric vehicle, said battery pack including a positive terminal and a negative terminal, said method comprising:
 providing a sensor wire including a sensor resistor, said sensor wire having a first end and a second end;
 electrically coupling the first end of the sensor wire to either the positive terminal or the negative terminal of the battery pack from which the cooling fluid leak is to be detected;
 positioning the second end of the sensor wire at a location where leaked cooling fluid may accumulate;
 providing a non-conductive isolation patch between the second end of the sensor wire and a support tray on which the battery pack is mounted, where the isolation patch allows the second end of the sensor wire to be positioned relatively close to the support tray in order to detect a shallow accumulation of the leaked cooling fluid by a presence of a conductive path from the second end of the sensor wire around a peripheral edge of the isolation patch to the support tray, while preventing electrical arcing between the sensor wire and the support tray;
 providing a fault isolation circuit;
 monitoring a voltage output across the sensor resistor using the fault isolation circuit; and
 determining that the cooling fluid leak has occurred if the voltage output of the sensor resistor exceeds a voltage threshold.

10. The method according to claim 9 wherein the sensor wire includes a diode electrically coupled in series with the resistor for preventing electrical current from traveling into the battery pack terminal.

11. The method according to claim 9 wherein the fault isolation circuit monitors a voltage balance between the positive terminal and the negative terminal of the battery pack.

12. The method according to claim 9 wherein measuring a voltage output of the sensor wire includes providing an electrical connection between the battery pack terminal and a ground potential by a conductive path from the first end of the sensor wire through the leaked cooling fluid.

13. A battery circuit electrically coupled to a battery pack, said battery pack including a positive terminal and a negative terminal, said battery circuit comprising:
 a leak detection circuit for detecting a cooling fluid leak from a cooling fluid channel that cools the battery pack, said leak detection circuit including a resistor provided within a sensor wire, said sensor wire having a first end electrically coupled to the positive terminal or the negative terminal of the battery pack from which the cooling fluid leak is to be detected and a second end positioned at a location where the leaked cooling fluid may accumulate;
 a non-conductive isolation patch positioned between the second end of the sensor wire and a support tray on which the battery pack is mounted, where the isolation patch allows the second end of the sensor wire to be positioned relatively close to the support tray in order to detect a shallow accumulation of the leaked cooling fluid by a presence of a conductive path from the second end of the sensor wire around a peripheral edge of the isolation patch to the support tray, while preventing electrical arcing between the sensor wire and the support tray; and
 a fault isolation circuit electrically coupled to the positive terminal and the negative terminal of the battery pack, said fault isolation circuit monitoring a voltage potential across the resistor and providing a leak detected signal if the second end of the wire is positioned within the leaked cooling fluid and creates an electrical path from the battery pack terminal to ground.

14. The battery circuit according to claim 13 wherein the leak detection circuit includes a diode electrically coupled in series with the resistor for preventing electrical current traveling into the battery pack terminal.

15. The battery circuit according to claim 13 where a distance between the second end of the sensor wire and a component at ground potential is adjustable.

16. The battery circuit according to claim 13 wherein the fault isolation circuit monitors a voltage balance between a positive terminal and a negative terminal of the battery pack.

17. The battery circuit according to claim 13 wherein the battery pack is a high voltage battery pack on an electric vehicle.

* * * * *